(12) United States Patent
Yarbrough et al.

(10) Patent No.: US 7,663,130 B1
(45) Date of Patent: Feb. 16, 2010

(54) SYSTEM AND METHOD OF DETERMINING FLUID LEVELS IN CONTAINERS INCLUDING AN INFRARED DEVICE FOR DETECTING A FIRST VALUE ASSOCIATED WITH AN EMPTY PORTION OF A CONTAINER

(75) Inventors: Donald B. Yarbrough, Winter Park, FL (US); John Creegan, Winter Park, FL (US); Chris Creegan, Winter Park, FL (US)

(73) Assignee: FLIC Systems, LLC, Winter Park, FL (US)

( * ) Notice: Subject to any disclaimer, the term of this patent is extended or adjusted under 35 U.S.C. 154(b) by 0 days.

(21) Appl. No.: 12/391,304

(22) Filed: Feb. 24, 2009

Related U.S. Application Data

(60) Provisional application No. 61/086,472, filed on Aug. 6, 2008.

(51) Int. Cl.
*G01N 15/06* (2006.01)
(52) U.S. Cl. .................................. 250/577; 250/221

(58) Field of Classification Search ................ 250/577, 250/573, 221, 559.4, 214 AL, 339.02, 339.07, 250/339.06, 349; 356/379, 427; 73/290 R, 73/290 V, 293; 340/605–619
See application file for complete search history.

(56) References Cited

U.S. PATENT DOCUMENTS 3,225,191 A * 12/1965 Calhoun .................. 250/338.1

* cited by examiner

*Primary Examiner*—Que T Le
(74) *Attorney, Agent, or Firm*—McKinney Law, PLLC (57) ABSTRACT

A system and method of determining fluid levels in containers is disclosed. In a particular embodiment, a first value of infrared energy associated with an empty portion of a container is detected and the container is scanned to detect a second value of infrared energy that is different from the first value of infrared energy. The method also includes to store an upper limit value associated with a vertical location of an upper surface of a fluid level when the second value of infrared energy is detected and to scan the container to detect a third value of infrared energy that is different from the second value of infrared energy. In addition, a lower limit value associated with a vertical location of a lower surface of the fluid relative to the upper surface is stored when the third value of infrared energy is detected. A height of the fluid is determined using a difference between the upper limit value and the lower limit value.

20 Claims, 5 Drawing Sheets

SYSTEM AND METHOD OF DETERMINING FLUID LEVELS IN CONTAINERS INCLUDING AN INFRARED DEVICE FOR DETECTING A FIRST VALUE ASSOCIATED WITH AN EMPTY PORTION OF A CONTAINER

I. CROSS REFERENCE TO RELATED APPLICATIONS

This application claims the benefit of U.S. Provisional Application No. 61/086,472 filed Aug. 6, 2008. The disclosure of the provisional application is incorporated herein by reference.

II. FIELD

The present disclosure is generally related to a system and method of determining fluid levels in containers.

III. DESCRIPTION OF RELATED ART

Fluid levels in transparent containers may be determined visually. However, determining a fluid level in a container that is not transparent is more difficult. A measuring stick may be inserted into the container and removed with the level of fluid determined by the wetted surface of the measuring stick. However, the fluid level in containers may be desired to be obtained without using a measuring stick or otherwise not requiring to be in physical contact with the fluid to take a measurement. For example, covertly determining tank levels at an enemy fuel depot or tanker trucks is needed in military related operations. In addition, determining whether there are any flooded compartments above the waterline of a ship or determining the severity of flooding without a visual inspection or using manual methods is needed.

However, in view of the prior art at the time the present invention was made, it was not obvious to those of ordinary skill in the pertinent art how the identified needs could be fulfilled.

IV. SUMMARY

In a particular embodiment, a system of determining fluid levels in containers is disclosed. The system includes an infrared device to detect at least a first value, second value and third value of infrared energy emitted from the container relative to a spatial reference point, wherein the first value of infrared energy is associated with an empty portion of the container, the second value of infrared energy is associated with a vertical location of an upper surface of a fluid level, and the third value is associated with a vertical location of a lower surface of the fluid relative to the upper surface. The system further includes a scanning module to control the infrared device and a differencing module to determine a height of fluid in the container using the difference between the upper surface and lower surface of the fluid. In addition, the system includes a comparison module to compare the current volume of fluid of the container to at least one previously recorded volume.

One particular advantage provided by embodiments of the system and method of determining fluid levels in containers is the ability to detect and measure the fluid volume stored in substantially any container. For example, the system may be used by a homeland security team (e.g., coast guard, navy) to collect intelligence on ships without requiring a full boarding. This may be accomplished by measuring the amount of fluids being transported in a universal container carried on a cargo ship. The device may also be used to measure the amount of fluids being transported in tanker trucks as they travel along a highway.

Another particular advantage provided by embodiments of the system and method of determining fluid levels in containers is automatically determining the volume of fluids added or removed from the container since a previous reading. This allows more accurate and efficient tracking of the disbursement of fluids.

Other aspects, advantages, and features of the present disclosure will become apparent after review of the entire application, including the following sections: Brief Description of the Drawings, Detailed Description, and the Claims.

VI. DETAILED DESCRIPTION

Figure 1:
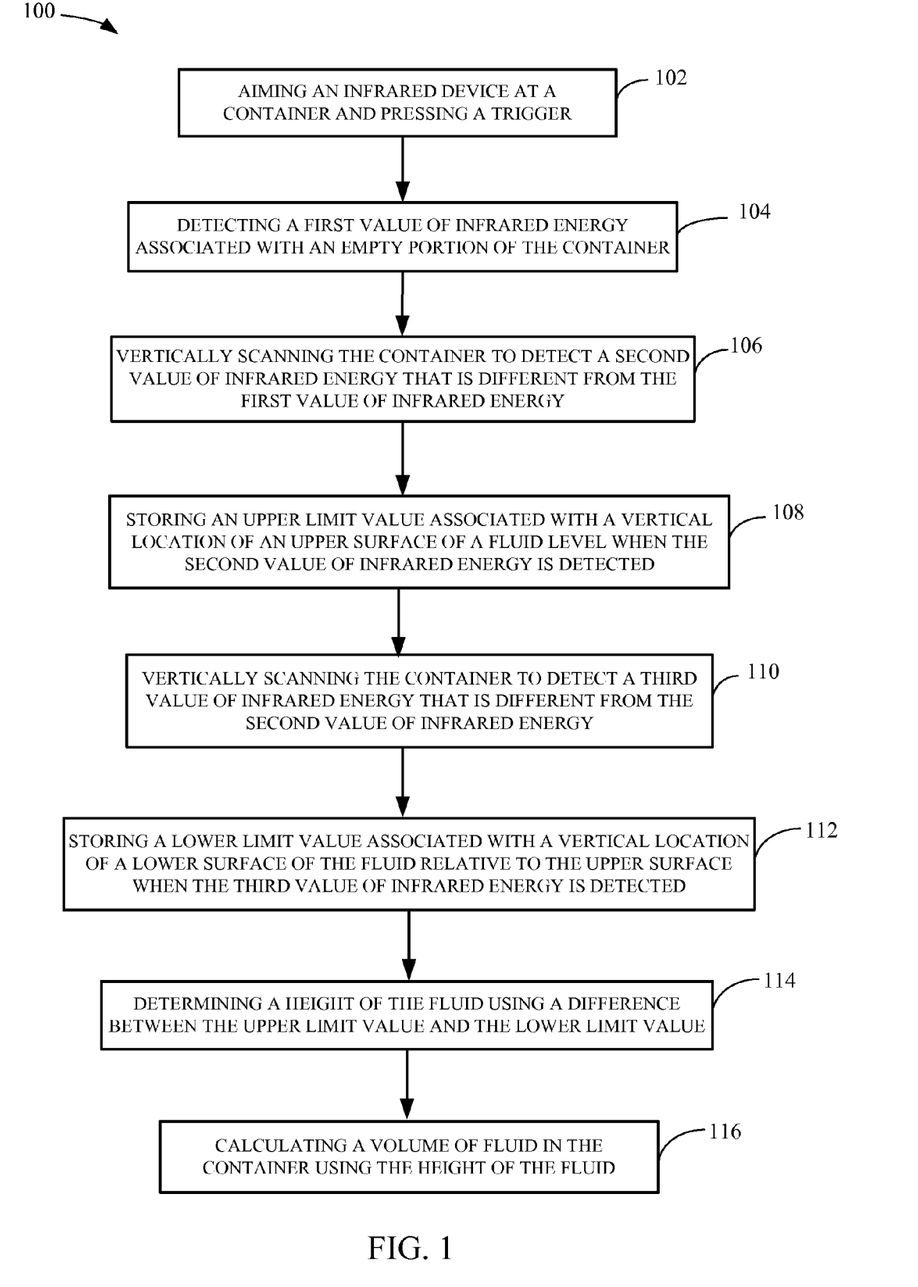
FIG. 1 is a flow diagram of a particular embodiment of a method of determining a fluid level in a container.

Referring to FIG. 1, a particular illustrative embodiment of a method of determining a fluid level in a container is disclosed and generally designated 100. An infrared device is aimed at the container, at 102, and a trigger is activated to activate the device. A first value of infrared energy associated with an empty portion of the container is detected, at 104. The infrared energy emitted from all objects indicates the temperature of the object. Infrared energy is part of the electromagnetic spectrum which includes radio waves, microwaves, visible light, ultraviolet, gamma, and X-rays. Infrared energy is between the visible light spectrum and radio waves. Infrared wavelengths are usually expressed in microns with the infrared spectrum extending between 0.7 microns to 1000 microns. The 0.7 to 14 micron band is used for infrared temperature measurement. Thus, the first value of infrared energy indicates a temperature of the outside of the container wall that is adjacent to an empty portion of the container.

Continuing to 106, the container is vertically scanned to detect a second value of infrared energy that is different from the first value of infrared energy. The second is adjacent to a portion of the container having fluid. The fluid in the container will be at a lower temperature than air within the empty portion of the container. Accordingly, the device determines the location of the interface between the air in the empty portion of the container and the surface of the fluid where the difference between the first value of infrared energy and second value of infrared energy is detected. Moving to 108, this upper limit value that is associated with a vertical location of an upper surface of a fluid level is stored when the second value of infrared energy is detected.

The container is scanned to detect a third value of infrared energy that is different from the second value of infrared energy, at 110. Continuing to 112, the third value is stored as a lower limit value associated with a vertical location of a lower surface of the fluid relative to the upper surface. A height of the fluid is determined using a difference between the upper limit value and the lower limit value, at 114. A volume of fluid in the container is calculated, at 116, using the height of the fluid that was determined at 114.

The method may also include controlling the scanning of the container using a motor means and a phase locked loop motor control. The motor means may alternatively include a computer controlled stepper motor with encoder. In operation, the motor means may oscillate an infrared sensor of the infrared device to capture the values of infrared energy emitted from the container relative to a spatial reference point and determine whether the infrared sensor (or optics) is at a scanning limit. Alternatively, the motor means may oscillate the optics focusing infrared energy to the sensor. The method may include displaying the calculated volume of fluid in the container. In addition, the method may include referencing or calibrating the infrared device at a start of each scanning session.

Figure 2:
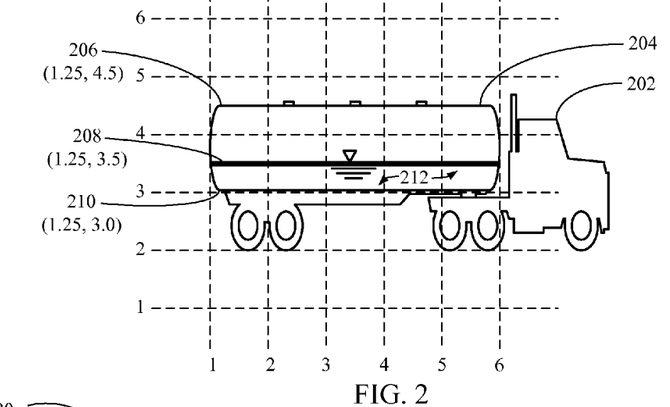
FIG. 2 is a diagram of a particular embodiment of a system of determining a fluid level in a container.

A diagram that illustrates an example of detecting the locations of infrared energy values is disclosed in FIG. 2 and generally designated as 200. A truck 202 is pulling a trailer container 204 that contains an unknown volume of fluid 212. A first value of infrared energy is detected at location 206, which is the empty portion of the container 204. The location may be stored using an (x, y) Cartesian coordinate system or any other similar type of system that may be used to identify a spatial location of infrared energy. For example, the first value of infrared energy associated with the empty portion of the container 204 is located at (1.25, 4.5). The second value of infrared energy that is different from the first value of infrared energy is associated with the upper surface of the fluid level and is located at (1.25, 3.5). The third value of infrared energy that is different from the second value of infrared energy and associated with a vertical location of a lower surface of the fluid is located at (1.25, 3.0). In this example, the readings along the x-axis are similar (i.e., 1.25) and confirms that a substantially vertical scan, or "slice", was completed of the container 204. Once, the upper surface of the fluid 208 and the lower surface of the fluid 210 are located, then the height of the fluid 212 is determined by the difference. For example, the difference between 3.5 and 3.0 is 0.5, which is the height of the fluid 212 in FIG. 2. The volume is determined using the height of the fluid 212 and the geometric configuration of the container 204. Alternatively, a thermal imager may be used to capture the scene instead of an infrared sensor. The thermal image may be analyzed to determine the upper and lower surfaces of the fluid. The volume is determined from the thermal image using the height of the fluid and geometric configuration of the container as explained above.

Figure 3:
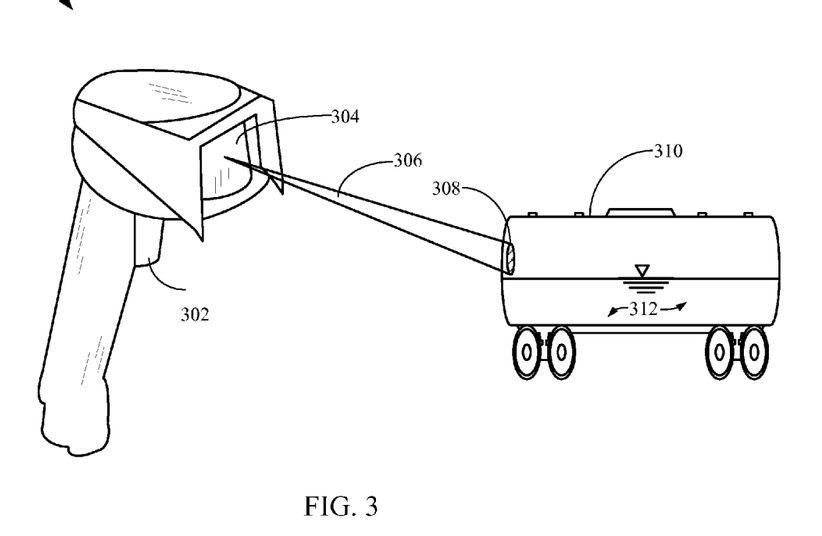
FIG. 3 is a diagram of a particular illustrative embodiment of an infrared device of the system of determining a fluid level in a container.

Referring to FIG. 3, the system includes an infrared device generally designated 300. The infrared device 300 may be tethered to a terminal, personal computer and/or have a built in multiple interface. In operation, the infrared device 300 is aimed at the desired container 310 and a trigger 302 is activated by a user to activate the infrared device 300. The infrared device 300 may include a laser sighting system synchronized to the sensor to visually indicate the location on the container where the infrared energy is currently being detected by the sensor. The infrared device 300 may include a transparent window 304 and a sensor (not shown) that detects infrared energy. The sensor produces an electric response representing the infrared energy that was detected of a particular portion of the container 310. The electronic response may be processed by conventional electronic circuits. Once the infrared device 300 is activated, optics of the infrared device 300 focus the infrared energy 306 to a small field of view 308. Thus, the optics allow the infrared device 300 to be operated from a distance from the container 310 to determine the fluid level 312 in accordance with the method of FIG. 1. The infrared device 300 may be handheld as shown in FIG. 3, or alternatively, mounted to an aircraft, ship, vehicle, building or other structure. In addition, the device 300 may store geometric information of a bottle or other container based on barcodes and the device 300 may include a barcode scanner. For example, a barcode on an alcoholic beverage bottle may be scanned. The information from the scanned barcode may be compared to a database of barcodes to determine the type and size of the alcoholic beverage container. A timestamp may be stored in the database as a corresponding entry to indicate each time a particular bottle was scanned and a volume determined. Thus, the volume of fluid consumed from a particular bottle between two timestamps (e.g., beginning and ending of a shift) may be indicated by the difference in volumes corresponding to each respective timestamp. The system may include a graphical user interface (GUI) to enter and manage the geometric configuration of the container. A fourth value of infrared energy associated with ambient conditions outside of the container may also be detected and stored. Further, any number of values of infrared energy may be detected and stored and the illustrative embodiments provided herein are not intended to be limiting.

Figure 4:
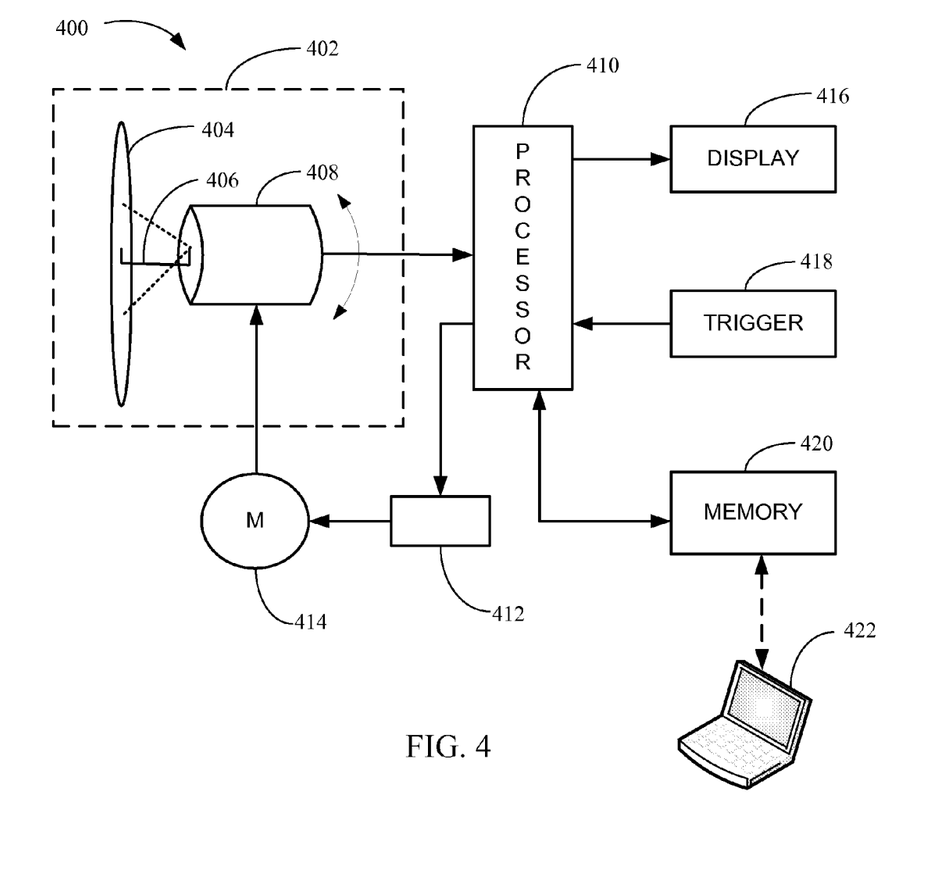
FIG. 4 is a block diagram of a particular illustrative embodiment of a system of determining a fluid level in a container.

With reference to FIG. 4, a particular illustrative embodiment of a system of determining a fluid level in a container is generally designated 400. In a particular embodiment, the system 400 may be configured to perform the methods and system depicted in FIGS. 1-3 and includes a motor control circuit 412 and motor 414, such as a computer controlled, phase-locked-loop controlled, or otherwise synchronized solenoid, cam or voice-coil or some other technique, which moves a supported pivoting member (not shown) of the assembly 402. The pivoting member may be attached to the sensor 408 as shown in FIG. 4 or, alternatively, to the optics 404 for focusing infrared energy from the reference target into the field of view of the sensor 408 of the infrared device 300. The focal length 406 is determined from the distance between the optics 404 and the sensor 408. The pivoting member may be attached using a hinge, pivots or another technique, and can be attached from and supported by its top edge, bottom edge or side to oscillate the sensor 408 or, alternatively, the optics 404.

The system 400 includes at least one processor 410 and a memory 420 that is accessible to the processor 410. The memory 420 includes media that is readable by the processor 410 and that stores data and program instructions that are executable by the processor 410. For example, the processor 410 may receive data representing the geometric configurations of containers and instructions used to calculate a volume of fluid. In addition, the data may also include historical values of volumes of fluid calculated previously for the containers and instructions used to calculate the volume of fluid added/removed since the last reading. An input device 422 and a display 416 are coupled to the device 402. In a particular embodiment, the input device 422 may include a keyboard, a pointing device, a touch screen, a speech interface, another device to receive user input, or any combination thereof.

Figure 5:
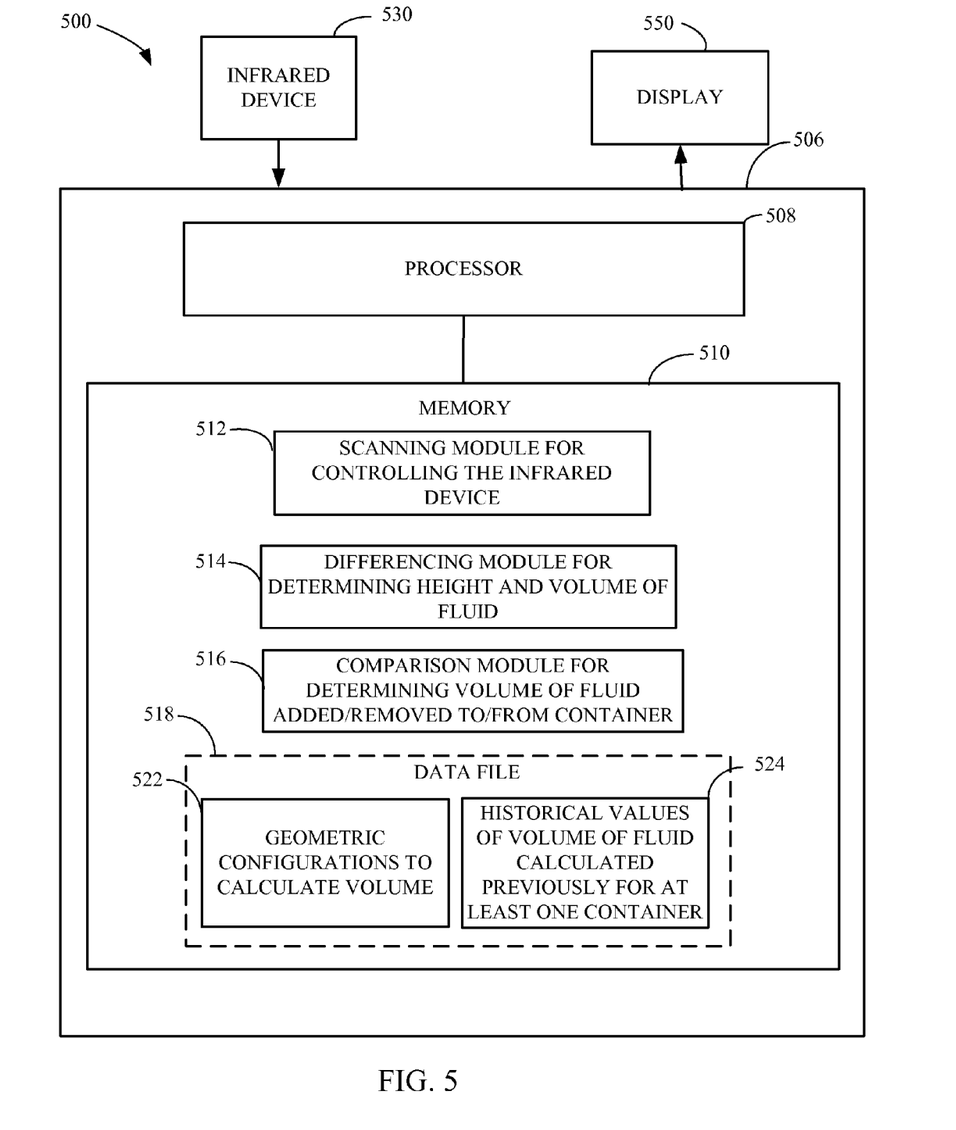
FIG. 5 is a block diagram of an illustrative embodiment of the infrared device used in the system to determine fluid levels in containers.

Referring to FIG. 5, a block diagram of particular illustrative embodiment of a system to determine a fluid level in a container is depicted and generally designated 500. In a particular embodiment, the system 500 may be configured to perform the method 100 depicted in FIG. 1. The system 500 includes an infrared device 530 having at least one processor 508 and a memory 510 that is accessible to the processor 508. The memory 510 includes media that is readable by the processor 508 and that stores data and program instructions that are executable by the processor 508, including a scanning module 512 for controlling the infrared device, a differencing module 514 for determining the height and volume of fluid in a container, a comparison module 516 for determining the volume of a fluid added or removed from a container based on stored historical data, and a data file 518 that includes configurations of containers to calculate volume 522 and values of volume of fluid calculated previously for at least one container 524. A display 250 is coupled to the system 500 and may include a liquid crystal display, a light emitting diode screen, or any other type of display suitable for this purpose may be used. Although depicted as separate components, the scanning module 512, the differencing module 514, the comparison module 516, or any combination thereof, may be integrated into a single software package or software applications that are compatible to interoperate with each other.

Figure 6:
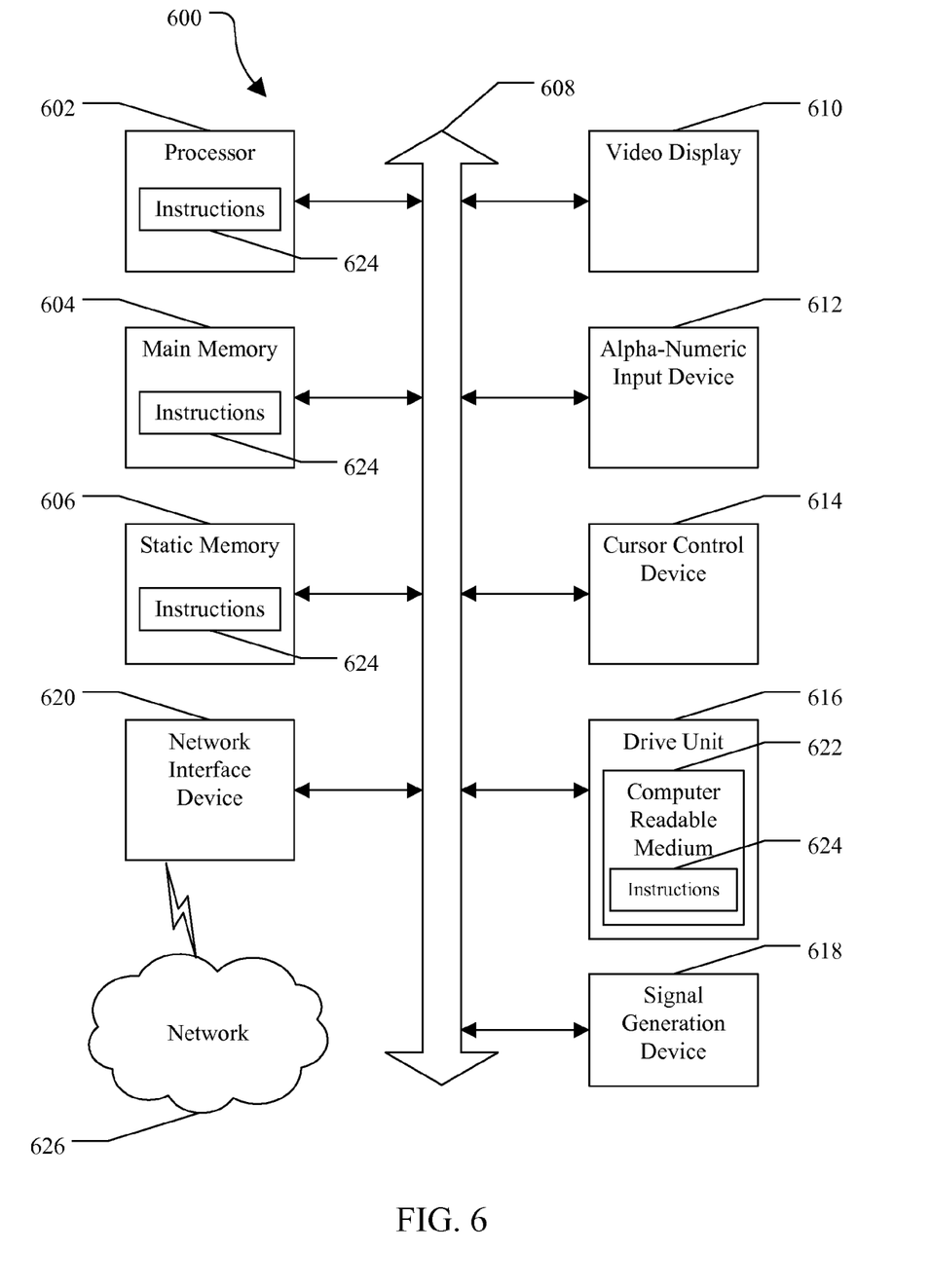
FIG. 6 is a block diagram of an illustrative embodiment of a general computer system.

Referring to FIG. 6, an illustrative embodiment of a general computer system is shown and is designated 600. The computer system 600 may include a set of instructions that may be executed to cause the computer system 600 to perform any one or more of the methods or computer based functions disclosed herein. The computer system 600, or any portion thereof, may operate as a standalone device such as the infrared device 300 or may be connected, e.g., using a network, to other computer systems or peripheral device.

In a networked deployment, the computer system may operate in the capacity of a server or a transmitter. The computer system 600 may also be implemented as or incorporated into various devices, such as the infrared device 300, personal computer (PC), a tablet PC, a media device (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 may be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 may include a main memory 604 and a static memory 606 that can communicate with each other via a bus 608. As shown, the computer system 600 may further include a video display unit 610, such as a liquid crystal display (LCD), a light emitting diode (LED), a flat panel display, a solid-state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing.

The present disclosure contemplates a computer-readable medium that includes instructions or receives and executes instructions responsive to a propagated signal, so that a device connected to a network can communicate voice, video or data over the network. Further, the instructions may be transmitted or received over the network via the network interface device.

The term medium includes a single medium or multiple media, such as a centralized or distributed database, and/or associated caches and servers that store one or more sets of instructions. The term medium shall also include any medium that is capable of storing, encoding or carrying out a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered an equivalent to a tangible storage medium. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that instructions and data of the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of determining a fluid level in a container, the method comprising:
   detecting a first value of infrared energy associated with an empty portion of the container;
   vertically scanning the container to detect a second value of infrared energy that is different from the first value of infrared energy;
   storing an upper limit value associated with a vertical location of an upper surface of a fluid level when the second value of infrared energy is detected;
   vertically scanning the container to detect a third value of infrared energy that is different from the second value of infrared energy;
   storing a lower limit value associated with a vertical location of a lower surface of the fluid relative to the upper surface when the third value of infrared energy is detected; and
   determining a height of the fluid using a difference between the upper limit value and the lower limit value.

2. The method of claim 1, further comprising aiming an infrared device at the container and activating a trigger.

3. The method of claim 2, further comprising calculating a volume of fluid in the container using the height of the fluid.

4. The method of claim 3, wherein the infrared device further comprising a motor means for controlling scanning the container.

5. The method of claim 3, further comprising displaying the volume of fluid in the container.

6. The method of claim 4, further comprising referencing the infrared device at a start of each scanning session.

7. The method of claim 4, wherein the infrared device includes a phase locked loop motor control circuit.

8. The method of claim 4, wherein the motor means includes a computer controlled stepper motor with encoder.

9. The method of claim 4, wherein the motor means oscillates an infrared sensor of the infrared device to capture the first value and the second value of infrared energy emitted from the container relative to a spatial reference point.

10. The method of claim 6, further comprising determining whether the infrared sensor is at a scanning limit.

11. A system of determining a fluid level in a container, the system comprising:
    an infrared device to detect at least a first value, second value and third value of infrared energy emitted from the container relative to a spatial reference point, wherein the first value of infrared energy is associated with an empty portion of the container, the second value of infrared energy is associated with a vertical location of an upper surface of a fluid level, and the third value is associated with a vertical location of a lower surface of the fluid relative to the upper surface;
    a scanning module to control the infrared device; and a differencing module to determine a height of fluid in the container using the difference between the upper surface value and the lower surface value of the fluid.

12. The system of claim 11, further comprising a comparison module to compare the current volume of fluid of the container to at least one previously recorded volume.

13. The system of claim 12, further comprising a memory device for storing a geometric configuration of the container to calculate a current volume of liquid in the container.

14. The system of claim 11, further comprising a display means for displaying the current volume of liquid in the container.

15. The system of claim 12, further comprising a graphical user interface (GUI) to enter and manage the geometric configuration of the container.

16. The system of claim 11, further comprising focusing optics disposed adjacent to an infrared sensor.

17. The system of claim 16, further comprising a phase locked loop motor control circuit.

18. The system of claim 17, further comprising a fourth value of infrared energy associated with ambient conditions outside of the container.

19. The system of claim 11, wherein the infrared device is a thermal imager.

20. The system of claim 11, further comprising a laser sighting system synchronized to the sensor to visually indicate the location on the container where the infrared energy is currently being detected by the sensor.

* * * * *